United States Patent [19]

Burr

[11] Patent Number: 5,052,428

[45] Date of Patent: Oct. 1, 1991

[54] VALVE REPAIR DEVICE

[75] Inventor: Jeffrey G. Burr, Newark, Del.

[73] Assignee: Allied-Signal Inc., Morris Township, Morris County, N.J.

[21] Appl. No.: 554,312

[22] Filed: Jul. 17, 1990

[51] Int. Cl.[5] .............................................. F16K 43/00

[52] U.S. Cl. .................................. 137/15; 29/402.15; 29/890.121; 137/315

[58] Field of Search ................. 137/15, 315, 312, 377, 137/382; 29/402.09, 402.14, 402.15, 402.17, 890.121; 220/85 P; 251/214

[56] References Cited

U.S. PATENT DOCUMENTS

| | | | |
|---|---|---|---|
| 2,206,707 | 7/1940 | Shaw | 137/382 |
| 3,194,256 | 7/1965 | Gonella et al. | 137/315 |
| 3,323,541 | 6/1967 | Schneider, Jr. et al. | 137/382 |
| 4,834,137 | 5/1989 | Kawaguchi et al. | 137/312 |
| 4,955,404 | 9/1990 | Pitzen | 137/15 |

FOREIGN PATENT DOCUMENTS

| | | | |
|---|---|---|---|
| 577013 | 6/1959 | Canada | 137/315 |

OTHER PUBLICATIONS

Superior Valve Company–Division of AMCAST Industrial Corp., "Chlorine Valves and Accessories'-'—Catalog CHL-90, pp. 1-4.

Book accompanying video on "The Chlorine Institute's Emergency A Kit".

*Primary Examiner*—George L. Walton
*Attorney, Agent, or Firm*—Melanie L. Brown; Jay P. Friedenson

[57] ABSTRACT

The present invention provides a repair device for a cracked valve. The present invention is a valve with at least one crack on the packing nut or threaded portion thereof wherein the valve has a repair device for the crack installed thereon. The repair device comprises the combination of: (a) means for reinforcing the threaded portion of the cracked valve; and (b) means for securing the reinforcing means to the cracked valve. The combination applies a circumferential clamping force on the cracked valve and a driving force on the packing nut. The present composition is useful in repairing cracked valves on containers such as high pressure seamless tubes used for transporting boron trifluoride gas.

14 Claims, 4 Drawing Sheets

VALVE REPAIR DEVICE

BACKGROUND OF THE INVENTION

The present invention relates to a valve repair device and more specifically, a valve repair device for gas containing containers such as seamless pressure tubes and cylinders.

Gases such as boron trifluoride are typically shipped as compressed gases in seamless high pressure tubes and cylinders at pressures between 1,500 and 2,000 pounds per square inch gauge (psig) (10,500 and 14,000 kPa). A commonly used seamless pressure tube has a valve for loading the gas into the tube and subsequently releasing the gas from the tube. A commonly used valve has a threaded cylindrical portion which receives a stem and a polymeric valve gasket. A packing nut also is screwed onto the threaded cylindrical portion to compress the polymeric valve gasket. Frequently, these valves crack at the threaded cylindrical portion either in a vertical or a horizontal direction or on the packing nut in a horizontal direction as explained more fully below.

When a compressed gas such as boron trifluoride is released from a seamless pressure tube, the gas temperature decreases due to the pressure drop (Joule-Thomson Effect) and as a result, the polymeric valve gasket contracts and gas may begin to leak through the valve packing. A worker then tightens the valve packing nut to seal the leak. When the temperature then increases, the polymeric valve gasket expands against the threaded cylindrical portion of the valve. This expansion may cause the threaded cylindrical portion of the valve or the packing nut to crack.

Gas then begins to immediately leak from the seamless pressure tube through the cracked valve. The leaking of boron trifluoride is readily apparent because in the presence of water, boron trifluoride fumes and forms clouds of dense white smoke with a sharply acidic odor. Boron trifluoride gas is an acid-like pulmonary irritant which attacks mucous membranes and may result in acute toxic effects. As such, breathing of boron trifluoride gas, or fumes formed by hydration of the gas with atmospheric moisture, must be avoided. The problem of toxic gases leaking through cracked valves on high pressure tubes has plagued the industry for years.

Gases such as chlorine are typically shipped as compressed gases in low pressure cylinders at pressures between 100 and 150 pounds per square inch gauge (psig) (700 and 1,050 kPa). Low pressure cylinders typically hold about 60 pounds of product and are shipped in pallets. The leaking of chlorine is apparent because in the presence of ammonia water, chlorine fumes and forms clouds of dense white smoke. Chlorine gas is toxic as an irritant and by inhalation.

One system which has been successful in containing a leaking gas from a low pressure cylinder is The Chlorine Institute's Emergency A Kit. In this system, two workers roll the tube on end onto a base having three chains connected thereto; the length of each chain exceeds the length of the tube. One of the workers then places a metallic hood over the valve end of the tube with a rubber gasket to seal the gap between the metallic cap and the tube body and then places a yoke having cap screws on the top of the metallic hood. The other worker then hooks each chain onto the yoke and tightens the cap screws. As such, this system contains any gas within the metallic hood and rubber gasket.

The Chlorine Institute's Emergency A Kit was not designed to handle high pressure tubes and high pressure cylinders and therefore, is not useful therewith. If a worker attempted to use such a kit with tubes at pressures greater than about 200 psig (1,400 kPa), the metallic hood would be unable to withstand the pressure and thus, would not contain the leaking gas.

The Chlorine Institute's Emergency A Kit also suffers from the following disadvantages. The Chlorine Institute's Emergency A Kit merely provides for containment of the leaking gas. Also, a typical trailer for transporting and storing gas filled seamless pressure tubes may carry as many as thirty tubes in a stacked arrangement. Because the tubes may spend months or years on a trailer at a customer's location, valve cracks can readily occur. Because The Chlorine Institute's system requires access to the tube body as well as the valve and because only the valve ends of tubes on a trailer are readily accessible to an installer, this system is inapplicable to cracked valves on tubes loaded on a trailer. Also, due to the lengthly installment time involved, The Chlorine Institute recommends that the installers wear protective clothing and a self-contained breathing apparatus. Also, due to the equipment involved, two workers are required to install the system. Additionally, The Chlorine Institute considers the Emergency A Kit as an interim measure and recommends emptying the gas from the tube as soon as possible.

As such, a long-felt need has existed for a repair device for cracked valves on high pressure tubes.

SUMMARY OF THE INVENTION

The present invention fulfills this long-felt need in the art by providing a repair device for a cracked valve. The present invention is a valve with at least one crack on the packing nut or threaded portion thereof wherein the valve has a repair device for the crack installed thereon. The repair device comprises the combination of: (a) means for reinforcing the threaded portion of the cracked valve; and (b) means for securing the reinforcing means to the cracked valve. This combination applies a circumferential clamping force on the cracked valve and a driving force on the packing nut.

Thus, unlike The Chlorine Institute's Emergency A Kit, the present invention is useful for high pressure seamless tubes. Also, unlike The Chlorine Institute's Emergency A Kit, the present invention has the following advantages. The present invention repairs the cracked valve and does not merely contain the leaking gas. Also, installation of the present invention requires access to only the valve end of the tube and not the body also. Also, because a worker can apply the present invention to a cracked valve in a brief time, use of protective clothing and breathing apparatus may not be necessary. Additionally, the present invention facilitates safe off-loading of the gas because the valve remains accessible and operable.

The problem of cracked valves on high pressure seamless tubes has existed for at least 25 years. The present inventor believes that the present invention has in fact satisfied this long-felt need in the industry because customer satisfaction with the present invention has been overwhelming.

Thus, an object of the present invention is to provide a valve repair device for containers such as high pressure tubes and cylinders.

An additional object of the present invention is to provide a valve repair device for high pressure tubes wherein the device does not merely contain the leaking gas, does not require access to the tube body, does not involve a lengthly installation time, and is not an interim measure.

Other advantages of the present invention will become apparent from the following description and appended claims.

DETAILED DESCRIPTION OF THE PREFERRED EMBODIMENTS

Figure 1:
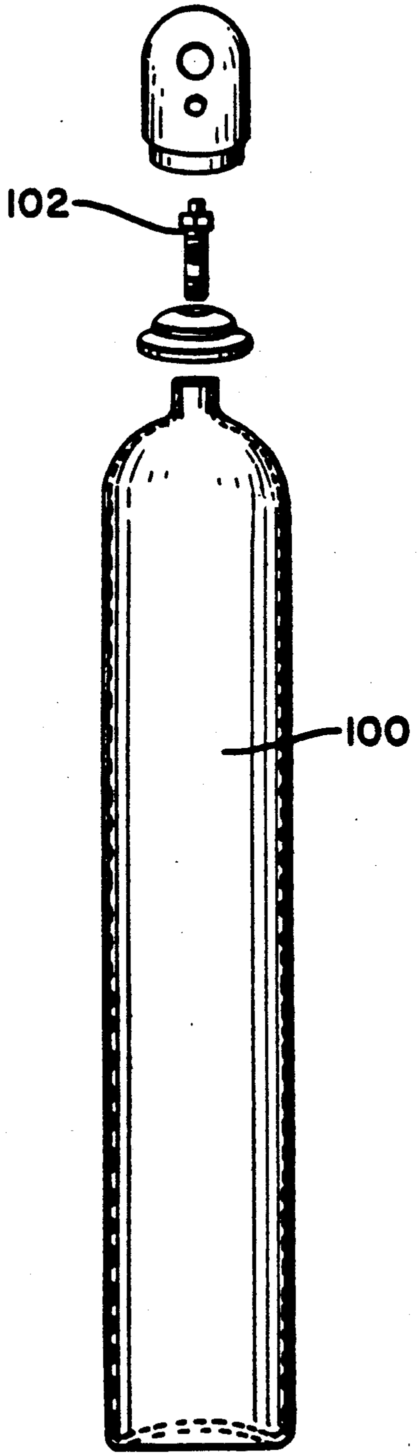
FIG. 1 illustrates a seamless high pressure cylinder.

FIG. 1 illustrates a seamless high pressure cylinder 100 having a valve 102. A commonly used seamless high pressure cylinder is available from Christy Park Industries, Inc.

Figure 2:
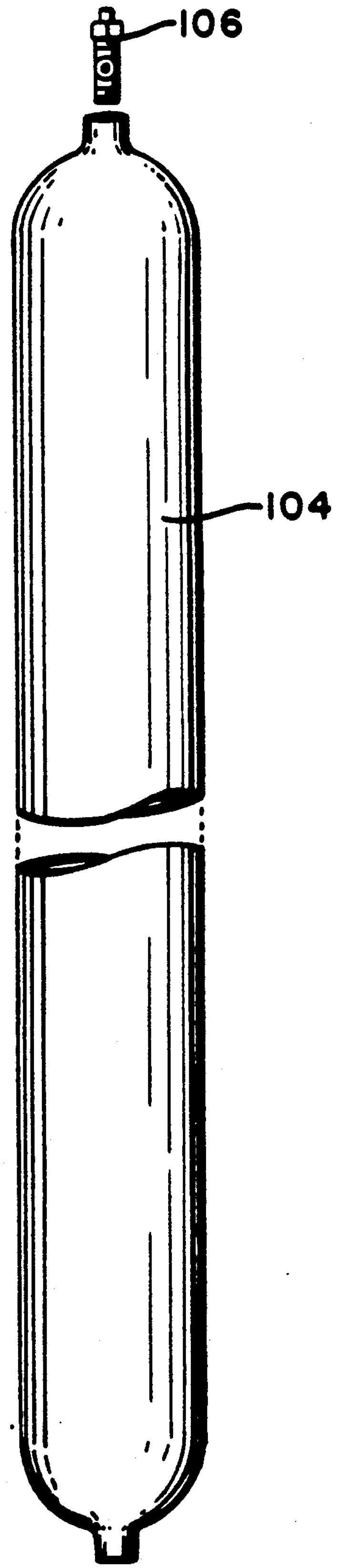
FIG. 2 illustrates a seamless high pressure tube.
Figure 3:
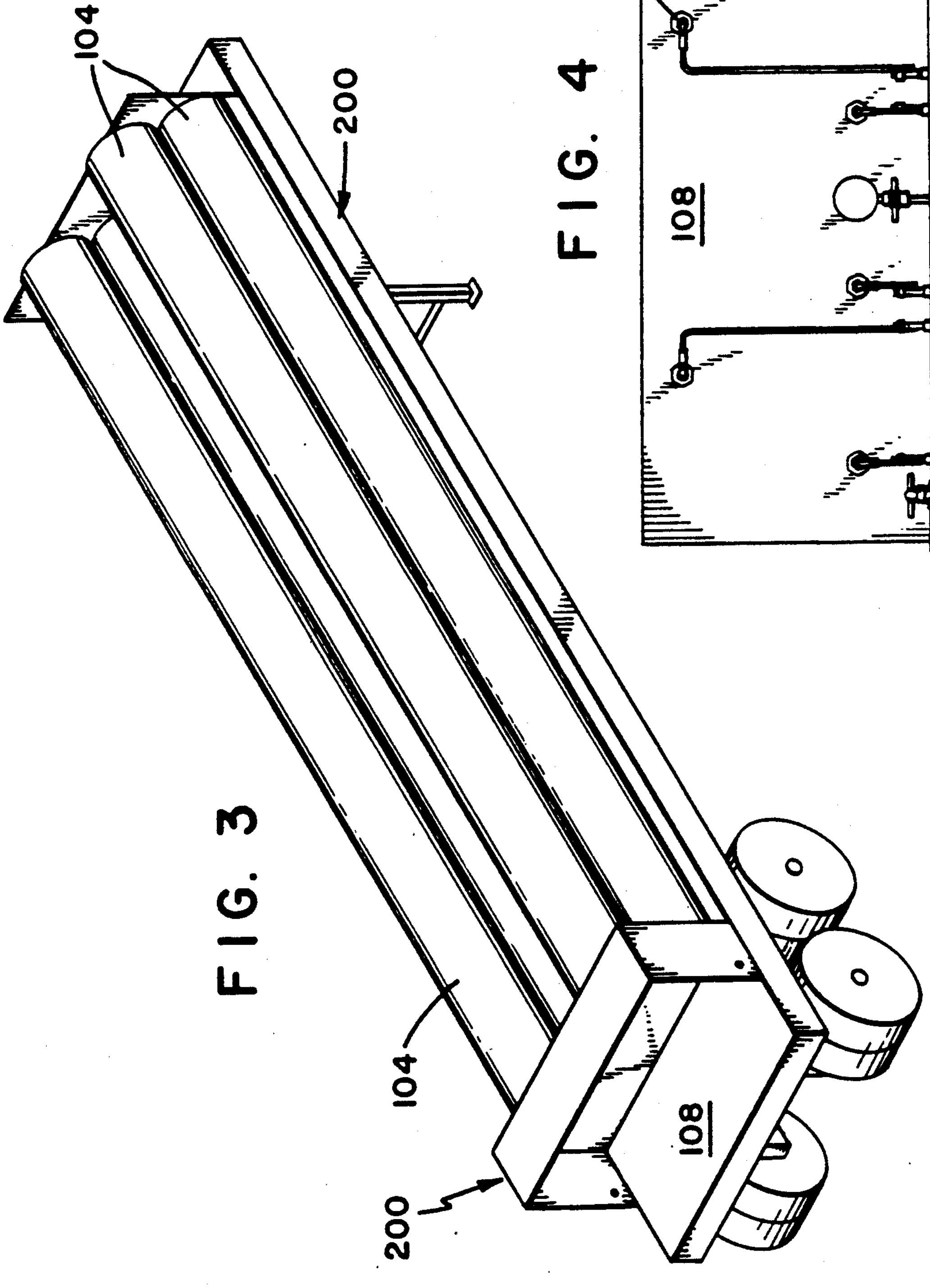
FIG. 3 illustrates a typical trailer for transporting the seamless high pressure tubes of FIG. 2.
Figure 4:
FIG. 4 illustrates the manifold cabinet of the trailer of FIG. 3.

FIG. 2 illustrates a seamless high pressure tube 104 having a valve 106. Commonly used seamless high pressure tubes are available from Christy Park Industries, Inc. as DOT-3AA-2400, DOT-3AAX-2400, and DOT-3T-2400. FIG. 3 illustrates a typical trailer 200 for transporting and storing seamless high pressure tubes; trailers typically have from six to 32 of the seamless high pressure tubes 104 of FIG. 2 thereon. A typical trailer 200 has a manifold cabinet 108 as seen in FIGS. 3 and 4; in such an arrangement as can be readily seen and understood, only the valve ends of the tubes are readily accessible.

Figure 6:
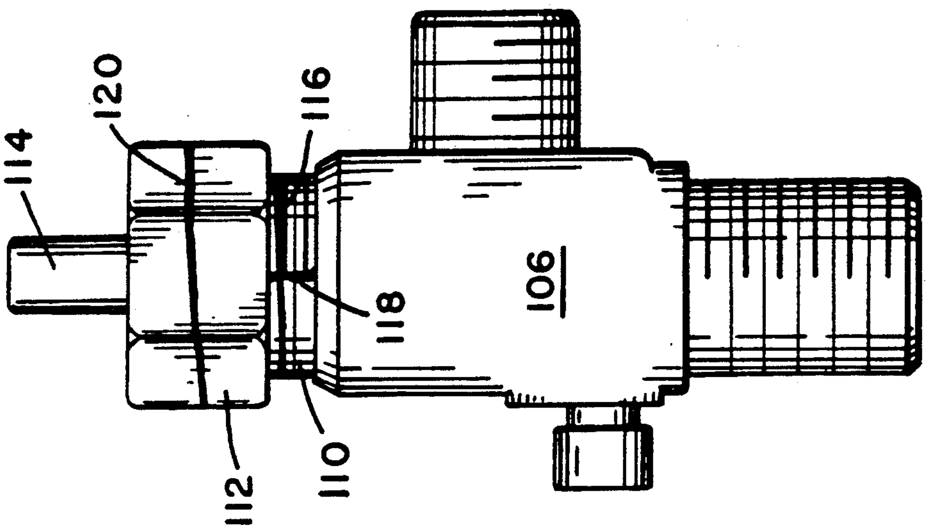
FIG. 6 illustrates a cracked version of the valve of FIG. 5.
Figure 5:
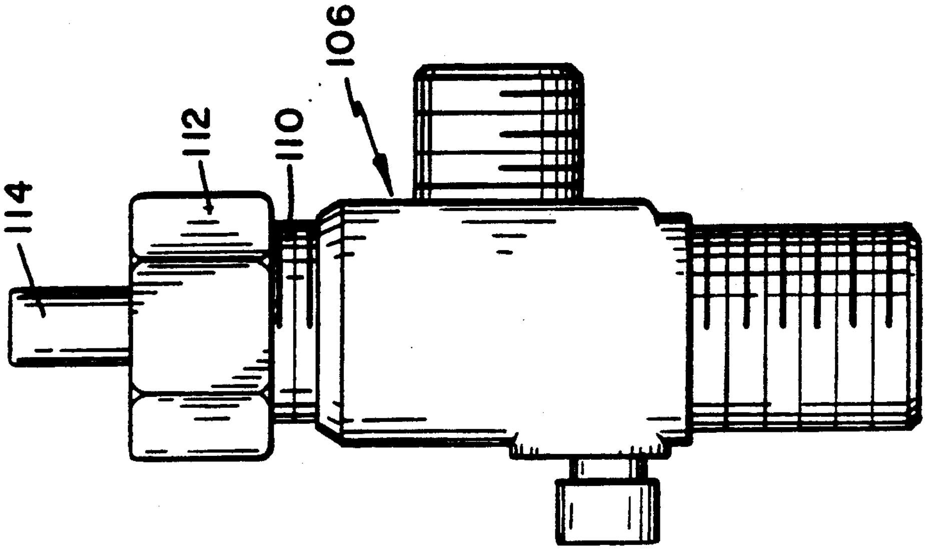
FIG. 5 illustrates the valve of the seamless high pressure tube of FIG. 2.

FIG. 5 is a close-up of the valve 106 of FIG. 2. The valve 106 has a threaded portion 110 with a packing nut 112 and stem 114 thereon. One commonly used valve is of brass alloy and is available from Superior as Model 1214Y-35L3C. FIG. 6 illustrates the location of typical cracks in valve 106. On the threaded portion 110 of valve 106, cracks such as horizontal crack 116 or vertical crack 118 are common. On the packing nut 112 of valve 106, cracks such as horizontal crack 120 are common. Although three cracks are illustrated on one valve, typically only one crack occurs.

The present invention provides a repair device for a cracked valve. The present invention is a valve with at least one crack on the packing nut or threaded portion thereof wherein the valve has a repair device for the crack installed thereon. The repair device comprises the combination of: (a) means for reinforcing the threaded portion of the cracked valve; and (b) means for securing the reinforcing means to the cracked valve. This combination applies a circumferential clamping force on the cracked valve and a driving force on the packing nut.

The first part of the combination is a means for reinforcing the threaded portion of the cracked valve. Any means which adequately reinforces the threaded portion can be used. Preferably, the means has a first threaded surface which engages the threaded portion of the valve and a second threaded surface which does not engage the threaded portion of the valve. More preferably, the second threaded surface is a tapered pipe thread.

Most preferably, reinforcing means (a) comprises two semi-circular shaped pieces. The first threaded surface of each piece is the inner diameter while the second threaded surface is the outer diameter. The outer diameter is greater than the inner diameter and the top and bottom of each piece are flat. Those skilled in the art will readily understand that the foregoing describes a split bushing.

Figure 7:
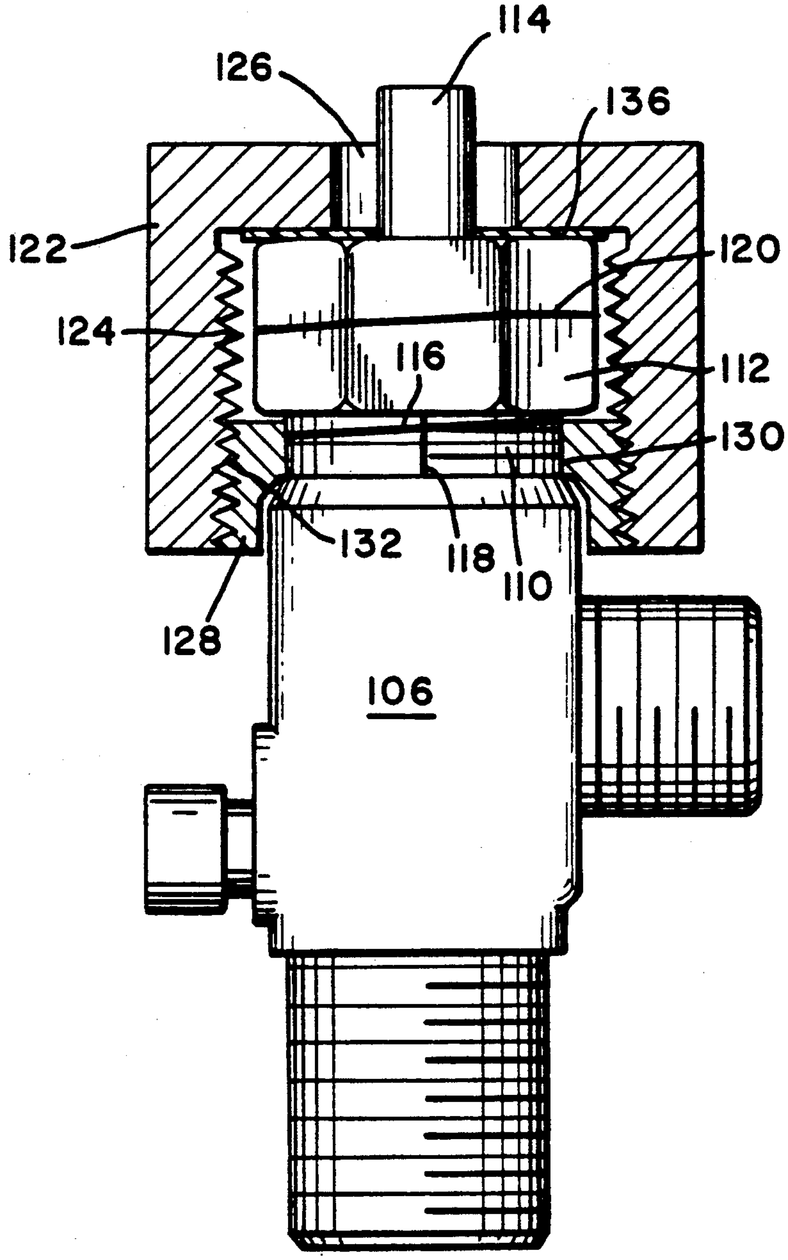
FIG. 7 illustrates the present invention.

FIG. 7 illustrates the present invention in cross-section on a valve having horizontal and vertical cracks on the threaded portion and a horizontal crack on the nut. In FIG. 7, split bushing 128 has a first surface 130 which is threaded and engages the threaded portion 110 of valve 106. The second surface 132 of split bushing 128 is threaded.

The second part of the combination is a means for securing the reinforcing means to the valve. Any means which supplies sufficient pressure to the reinforcing means to prevent further leakage of the gas involved can be used. Preferably, the securing means (b) has a first threaded surface which engages the second threaded surface of the reinforcing means (a). More preferably, the first threaded surface of the securing means (b) is a tapered pipe thread.

Most preferably, the securing means (b) has a cylindrical shape wherein one end of the cylinder is partially closed. Those skilled in the art will readily understand that the foregoing describes a pipe cap. The stem of the valve protrudes through the partially open end of the pipe cap.

In FIG. 7, the pipe cap 122 is a cylinder with a threaded first surface 124. The threaded first surface 124 of pipe cap 122 engages the second threaded surface 132 of split bushing 128. The pipe cap 122 has an opening 126 in its closed end so that stem 114 protrudes therethrough.

In the most preferred embodiment, a gasket 136 is placed on top of packing nut 112 prior to threading the pipe cap onto the bushing. The gasket provides further means for repairing the gas leak.

A polymeric tape may also be installed on the outer diameter of the bushing to provide further means for repairing the leak.

As an example of how to use the present invention, a split bushing is engaged with the threaded portion of a valve so that the split bushing surrounds and reinforces the threaded portion. A split bushing made of a high strength material such as forged steel and having a 1.25 inches (3.175 centimeters) ANSI taper pipe thread on the outside diameter and a 1.125 inches (2.858 centimeters)×18UNEF-2B thread on the inside diameter may be used. When the crack is on the threaded portion of the valve in a direction parallel to the length of the valve, the intersections of the ends of the split bushing are at 90° or right angles to the length of the crack.

A gasket and tape are then installed. A gasket which is 0.125 inch (0.3175 centimeter) thick, has a 0.75 inch (1.905 centimeters) inner diameter and 1.25 inches (3.175 centimeters) outer diameter, and is made of a polymeric material such as polytetrafluoroethylene may be used. A tape which is 0.25 inch (0.635 centimeter) wide×0.0625 inch (0.159 centimeter) thick and is made of a polymeric material such as polytetrafluoroethylene may be used.

A pipe cap is then threaded onto the split bushing so that the pipe cap surrounds the split bushing and secures the split bushing to the cracked valve. A pipe cap made of a high strength material such as forged steel, having a 1.25 inches (3.175 centimeters) female ANSI taper pipe thread inner diameter, having a 2.25 inches (5.7 centimeters) outer diameter, having a rating for 3000 psig, and having a 0.75 inch (1.905 centimeters) machined hole in the center of the cap may be used.

As the pipe cap is tightened, a clamping force is applied to the valve body because the split bushing and pipe cap have tapered pipe threads. This clamping force circumferentially reinforces the valve body and clamps the packing nut in place to prevent catastrophic failure of a damaged valve when operated.

When gas is required to be discharged from a tube having the present invention installed thereon, the gas is easily discharged through stem 114 which protrudes through opening 126.

The present invention also provides a method of discharging gas from a seamless high pressure tube having a cracked valve thereon. The crack is on the packing nut or threaded portion of the valve. The method comprises the steps of: (a) repairing the cracked valve with a combination of: (i) two semi-circular shaped pieces wherein each of the pieces has a first threaded surface which is the inner diameter and a second threaded surface which is the outer diameter. The outer diameter is greater than the inner diameter and the top and bottom are flat. The two semi-circular shaped pieces are installed so as to surround the threaded portion of the cracked valve. A cylinder (ii), wherein the cylinder has a first surface which is threaded and has an end which is partially closed, is installed so as to engage the second threaded surfaces of the semi-circular pieces. This combination applies a circumferential clamping force on the cracked valve and a driving force on the packing nut and thus, repairs the cracked valve. Step (b) is discharging the gas in the seamless high pressure tube through the stem of the repaired cracked valve.

The present invention is useful on most valves including those on low pressure cylinders. The present invention is particularly useful on valves on seamless high pressure tubes and is most advantageous to use when the seamless high pressure tube is one of a plurality of seamless high pressure tubes on a trailer for transporting the seamless high pressure tubes.

Having described the invention in detail and by reference to preferred embodiments thereof, it will be apparent that modifications and variations are possible without departing from the scope of the invention defined in the appended claims.

What is claimed is:

1. A valve adapted for use with a gas cylinder having a cylindrical stem with a packing assembly thereon, said packing assembly including: a ring-shaped packing washer, at least two ring-shaped packings, and a ring-shaped packing gland, said valve having a cylindrical shaped body having an inner surface which engages and surrounds said packing washer and said packings and having a male threaded outer diameter, and said valve having a packing nut having an inner diameter which engages said male threaded outer diameter of said cylindrical shaped body and surrounds said packing glad so as to compress said packing assembly, wherein when said valve has at least one crack on the packing nut or said male threaded outer diameter of said cylindrical shaped body, said valve having a repair device for repairing said crack, said repair device comprising the combination of:

(a) means for reinforcing said threaded portion of said cracked valve wherein said reinforcing means has a female threaded surface which engages the male threaded outer diameter of said cylindrical shaped body of said valve and has a male threaded surface which is a tapered pipe thread and does not engage the male threaded outer diameter of said cylindrical shaped body of said valve; and (b) means for securing said reinforcing means to said cracked valve wherein said securing means has a female threaded surface which is a tapered pipe thread and engages said male tapered pipe thread of said reinforcing means wherein upon engaging said reinforcing means and said securing means with each other, said engaged tapered pipe threads apply a circumferential clamping force and a driving force on said cracked cylindrical shaped body and/or a driving force on said cracked packing nut and said packing gland to compress said packing assembly to prevent gas from said gas cylinder from leaking from said valve.

2. The cracked valve of claim 1 wherein said at least one crack is on the threaded portion of said valve.

3. The cracked valve of claim 1 wherein said at least one crack is on the packing nut of said valve.

4. The cracked valve of claim 1 wherein said reinforcing means (a) comprises two semi-circular shaped pieces wherein in each of said pieces, said first threaded surface is the inner diameter and said second threaded surface is the outer diameter, said outer diameter being greater than said inner diameter and the top and bottom are flat.

5. The cracked valve of claim 4 wherein when said crack is on the threaded portion of said valve in a direction parallel to the length of said valve, the intersections of the ends of said two semi-circular pieces are at 90° angles to the length of said crack.

6. The cracked valve of claim 1 wherein said securing means (b) has a cylindrical shape wherein one end of said cylinder is partially closed.

7. The cracked valve of claim 11 wherein said packing nut surrounds the stem of said valve and said stem protrudes through said partially open end of said securing means (b).

8. The cracked valve of claim 6 further comprising a gasket situated between the partially closed end of said securing means (b) and said packing nut.

9. The cracked valve of claim 1 wherein said cracked valve is on a seamless high pressure tube.

10. The cracked valve of claim 1 wherein said cracked valve in on a low pressure cylinder.

11. The cracked valve of claim 9 wherein said cracked valve in on said seamless high pressure tube which is one of a plurality of seamless high pressure tubes on a trailer for transporting said seamless high pressure tubes.

12. A method of discharging gas from a seamless high pressure tube having a cracked valve thereon, said cracked valve having a cylindrical stem with a packing assembly thereon, said packing assembly including: a ring-shaped packing washer, at least two ring-shaped packings, and a ring-shaped packing gland, said valve having a cylindrical shaped body having an inner surface which engages and surrounds said packing washer and said packings and having a male threaded outer diameter, and said valve having a packing nut having an inner diameter which engages said male threaded outer diameter of said cylindrical shaped body and surrounds said packing gland so as to compress said packing assembly, wherein when said crack is on the packing nut or on said male threaded outer diameter of said cylindrical shaped body of said valve, said valve having a repair device for repairing said crack, said crack repair comprising the steps of:

(a) repairing the cracked valve with a combination of:

(i) two semi-circular shaped pieces wherein each of said pieces has a first threaded surface which is the inner diameter and a second threaded surface which is the outer diameter, said outer diameter being greater than said inner diameter and the top and bottom are flat, which surround the male threaded outer diameter of said cylindrical shaped body of said cracked valve and (ii) a cylinder wherein the cylinder has a first surface which is threaded and has an end which is partially closed, which engages the second threaded surfaces of said semi-circular pieces wherein said second threaded surfaces of said two semi-circular shaped pieces and said first threaded surface of said cylinder are tapered pipe threads, said engaging tapered pipe threads applying a circumferential clamping force and a driving force on said cracked cylindrical shaped body and/or a driving force on said cracked packing nut and said packing gland to compress said packing assembly to prevent gas from said seamless high pressure tube from leaking from said valve; and (b) discharging said gas in said seamless high pressure tube through said stem of said repaired cracked valve.

13. The method of claim 12 wherein said discharging gas is boron trifluoride.

14. The method of claim 12 wherein said seamless high pressure tube is one of a plurality of seamless high pressure tubes on a trailer for transporting said seamless high pressure tubes.

* * * * *